Sept. 8, 1964
R. F. STELZER ETAL
3,147,772
OIL CONTROL VALVE
Filed Feb. 23, 1960
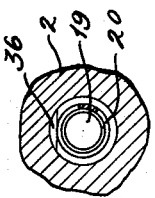
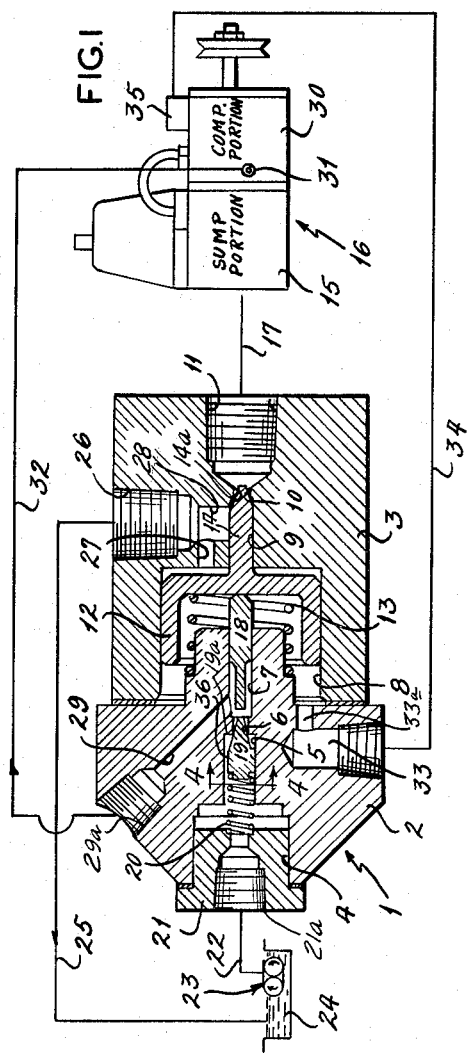
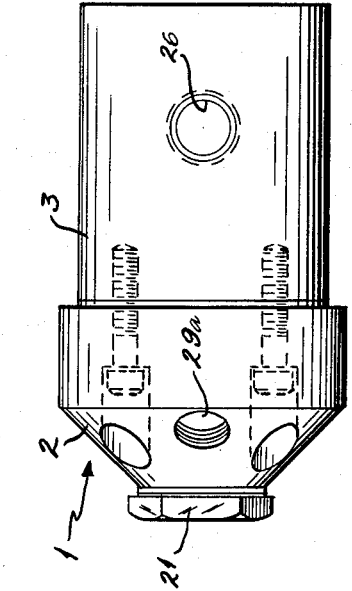
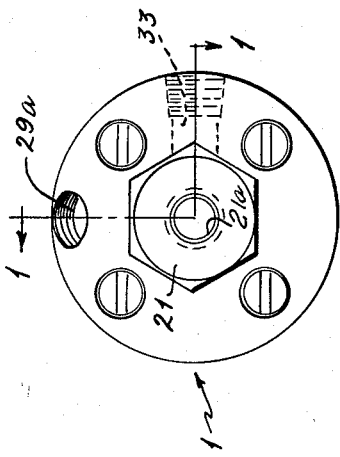
INVENTOR:
RAYMOND F. STELZER
CYRIL B. FITES
BY Gravely, Lieder, & Woodruff
ATTORNEYS.

United States Patent Office 3,147,772
Patented Sept. 8, 1964

3,147,772
OIL CONTROL VALVE
Raymond F. Stelzer, Berkeley, and Cyril B. Fites, St. John, Mo., assignors to Wagner Electric Corporation, St. Louis County, Mo., a corporation of Delaware
Filed Feb. 23, 1960, Ser. No. 10,177
2 Claims. (Cl. 137—630.22)

The present invention relates generally to valves and more particularly to an oil control or oil lubricating valve for use in conjunction with compressors and the like.

Various lubricating devices have been devised in the past and some have even been devised for use with compressors and the like. The known devices, however, have not provided means for feeding lubricant from a circulating source directly into the compressor mechanism of a compressor and at the same time provided means for draining excess lubricant out of the compressor and feeding it back to the source. In other words, so far as is known, no one heretofore has devised means for circulating lubricant from an external source through the working mechanism of a compressor during operation thereof. To this end the present device comprises a control valve having a circulating source of lubricant connected thereto, said valve including means for connecting said source directly to the working members of a compressor or like structure, and other means for draining excess lubricant that accumulates in the compressor back to the source.

It is therefore a principal object of the present invention to provide improved means for lubricating compressors and the like.

Another object is to provide means for circulating oil from an external source through a compressor.

Another object is to provide relatively inexpensive means for lubricating a compressor or the like which can be installed as original equipment or added as an improvement to existing equipment.

Another object is to provide lubricating means which can be mounted on the equipment to be lubricated or that can be installed at a remote location therefrom.

Another object is to provide lubricating means which are controlled by changes that occur in the equipment to be lubricated.

Another object is to provide means for feeding lubricant to the working members of a device and to thereby partially relieve the load thereon.

Still another object is to provide a controlled path for circulating lubricant through a compressor or similar device.

These and other objects and advantages of the present invention will become apparent after considering the following detailed specification of a particular embodiment of the invention in conjunction with the accompanying drawing.

In the drawing:

FIG. 1 is a schematic view showing the components of an oil control valve and associated lubrication system, the control valve portion being in section as taken on line 1—1 of FIG. 2;

FIG. 2 is a left end view of the control valve portion of the lubricant system shown in FIG. 1;

FIG. 3 is a top view of the same control valve portion; and

FIG. 4 is an enlarged fragmentary cross-sectional view taken on line 4—4 of FIG. 1.

Referring to the drawing more particularly by reference numbers, the number 1 refers to an oil control valve constructed according to the present invention. The valve 1 has two connected housing portions 2 and 3, and a plurality of different sized connected passages or bores extending therethrough. These connected bores are numbered in order from left to right as the bores 4, 5, 6, 7, 8, 9, 10 and 11.

The bore 8 is the largest of the connected bores and slidably receives a piston member 12. A compression spring 13 is positioned in the bore 8 between the left end of the bore 8 and the left side of the piston 12 urging the piston 12 rightwardly into a normally closed position in which a rightwardly extending portion or valve 14 thereof, which is slidably positioned in the bore 9, engages a valve seating surface 14a formed at the junction between the bores 9 and 10. The bore or sump port 11 which is the right-most bore is connected to an oil sump portion 15 of a compressor 16 by a conduit 17 and provides a return path or drain off path for excessive lubricant in the sump as will be shown.

A push rod 18 is slidably positioned in the bore 7 to the left of the piston 12. The push rod 18 is interposed between the piston 12 on its right and a valve member 19 on its left. The valve member 19 is slidably positioned in the bore 6 and is biased into a sealable engagement with a valve seat 19a formed at the juncture between bores 5 and 6 by a compression spring 20 which is positioned between the left end of the member 19 and a fitting member 21 fixedly positioned in the bore 4.

The fitting member 21 has a passage or inlet bore 21a therethrough which is connected by a conduit 22 to the output side of an oil pump 23, and the oil pump 23 is fed by a reservoir 24 associated therewith. The reservoir 24 in turn is fed by a conduit 25 which has one of its ends connected to a return port 26 in the valve housing portion 3. The return port 26 communicates with the bore 8 on the right side of the piston 12 through a passage 27, and also communicates with the bore 9 through a passage 28.

Another passage 29 extends through the housing portion 2 between an outlet port 29a and the bore 7 adjacent to the left side of the push rod 18. The outlet port 29a is the principal outlet for the valve 1 and is connected to a pressure side or compression portion 30 of the compressor 16 at 31 by a conduit 32.

To complete the description of the components of the valve 1, a passage or control port 33 intersects with a passage 33a and is provided and is used for controlling the operation of the valve. The passage 33 is connected by a conduit 34 to a control valve 35 for the compressor 16. The passages 33 and 33a also communicate the compressor control valve 35 with the bore 8 on the left side of the piston 12. The control valve 35, which forms no part of this invention, operates the valve 1 by establishing a partial vacuum in the bore 8 on the left side of the piston 12 which thereby establishes a pressure differential across the piston 12 and causes the piston 12 to move leftwardly to an open position as will be shown.

It should also be noted that the valve member 19 is provided with one or more marginal cutout portions 36 which facilitate movement thereof in the bore 5 and provide means for lubricant to move thereby when open.

It is also necessary to provide some means for unloading the pump 23 when the valve member 19 is in closed position. In the usual situation the subject valve is employed on an engine or the like, and the pump 23 supplies lubricant to a number of devices including the subject compressor. One of the other devices (not shown) provides the open return path necessary for unloading the pump.

The oil control valve 1 is shown for illustrative purposes remotely positioned relative to the compressor 16, but it is contemplated to connect the two units directly as by mounting the valve on the compressor without changing the basic idea of the invention, and in some cases this may actually be preferred.

During the "ON" or compression cycle of the compressor 16, which is when the compressor is compressing air, the control passage 33 is vented to atmosphere through through the compressor control valve 35. Since the control valve 35 is not a part of the present invention, the details of its construction and operation are only generally described. When the passage 33 is vented to atmosphere, however, it is sufficient to note that the piston 12 is in its rightward closed position as shown in FIG. 1. This is so because the right side of the piston 12 is always vented to atmosphere through the passage 27 and the conduit 25, and there is therefore substantially no pressure differential across the piston 12 to move the piston leftwardly. Therefore, at this time the piston 12 is held in the rightward position by the compression spring 13.

In the rightward position of the piston 12, the rightwardly extending valve portion 14 seats against the junction between the bores 9 and 10 and prevents communication between the compressor oil sump 15 and the reservoir 24 via the conduits 17 and 25. Furthermore, in the closed position of the valve as described, the compression spring 20 urges the valve member 19 into a rightward seated position with the valve seat 19a and prevents the output of the pump 23 from flowing to the compressor 16 through the passage 29 and the conduit 32.

When, however, the compressor 16 changes to its "OFF" or non-compression cycle, which is under control of the control valve 35, the control valve 35 causes a partial vacuum to be created in the bore 8 on the left side of the piston 12. This partial vacuum establishes a pressure differential across the piston 12 since the right side thereof is at atmospheric pressure. This causes the piston 12 to move leftwardly in opposition to the force of the compression spring 13. In so doing the piston 12 engages the push rod 18 and moves the push rod 18 leftwardly until it engages the valve member 19. Thereafter, further leftward movement of the piston 12 and push rod 18 unseats the member 19 and provides an open path for lubricant to flow from the pump 23 to the compressor 16. The fluid flow path thus established is from the pump 23, into the inlet part 21a, the bore 4, the bore 5, and via the cutout 36, bores 6 and 7, passage 29, outlet port 29a and conduit 32 to the inlet port 31 on the compressor.

It will be readily understood that during the compression cycle of the compressor 16, the lubricant in the compressor is mixed with the air being compressed and thereafter again separated from the compressed air by suitable means in the compressor (not shown) and allowed to drain into the sump portion 15. It is one of the purposes of this invention to maintain the level of the lubricant in the sump 15 at a predetermined desirable level by draining off the overage in the sump 15 and feeding it back to the reservoir 24 for recirculation. This is done by gravity through the conduit 17 which is attached to the compressor sump at the desired lubricant level and by a pressure differential between the slightly pressurized oil sump 15 and the substantially atmospheric reservoir 24. The lubricant flows from the sump 15 into the conduit 17, the sump port 11, the bores 10 and 9, which are opened when the valve 14 is disengaged from the seat 14a, and then flows through the passage 28, the return port 26, and finally by conduit 25 feeds to the oil reservoir 24.

The push rod 18 is shorter than the distance between the valve members 12 and 19 when the valve is closed as shown in FIG. 1. Therefore, when a valve operation is initiated this play or free motion of the push rod 18 means that the return path for lubricant from the sump 15 to the reservoir 24 will be established before the feed path from the pump 23 to the compressor portion 30. This is desirable because it means that the pressure in the sump 15 which is on the output side of the compressor will be partially dissipated before lubricant is fed to the compressor thereby partially relieving the load on the pump 23.

When the compressor 16 again reverts to the "ON" cycle, the passage 8 on the left side of the piston 12 is again vented to atmosphere and the springs 13 and 20 restore their respective valve members 14 and 19 to closed positions as described above.

It is now apparent that there has been shown and described novel control means for supplying lubricant to a compressor or the like, said means comprising valve means for controlling the flow of lubricant from a source to the compressor and other valve means for controlling the flow of lubricant from the compressor back to the source to thereby maintain a predetermined lubricant level in the compressor.

Many changes, modifications, and alterations of the present device will become apparent to those skilled in the art after considering this specification and the accompanying drawing. All such changes, modifications and alterations, however, which do not depart from the spirit or scope of the invention are deemed to be covered by the invention which is limited only by the claims which follow.

What is claimed is:

1. In a compressor having interconnected pressurized compression and lubricant sump portions and control means periodically effecting atmospheric and sub-atmospheric pressure fluctuations for controlling the pressurization of said compressor compression and lubricant sump portions, a lubrication valve for controlling lubricant flow between a lubricant pump and said compressor compression portion and between said lubricant sump portion and an atmospheric lubricant reservoir for said pump in response to the periodic pressure fluctuations of said compressor control means comprising a housing having first and second passages therein for connection between said pump and compressor compression portion and between said pump reservoir and compressor sump portion including first and second valve seats, respectively, a first valve member normally urged into engagement with said first valve seat to close communication through said first passage, a piston having opposed faces and slidable in said housing between said first and second valve seats, said piston defining with said housing opposed first and second chambers adjacent to said opposed piston faces, said second chamber being in open communication with said second passage between said second valve seat and piston, a second valve member on said piston, said piston being normally urged in a direction to engage said second valve member with said second valve seat to close communication through said second passage, a valve operating member slidable in said housing between said first passage and first chamber and adapted for lost motion engagement between said first valve member and piston, and a control port in said housing connected with said first chamber, said control port being adapted for connection with said compressor control means and subject to the periodic pressure fluctuations thereof, said piston being initially movable to disengage said second valve member from said second valve seat and open communication through said second passage in response to a pressure differential between said first and second chambers when the pressure at said control port is sub-atmospheric, and said piston being further movable into lost motion engagement with said valve operating member to effect movement thereof in a direction to subsequently disengage said first valve member from said first valve seat and open communication through said first passage.

2. In a compressor having interconnected pressurized compression and lubricant sump portions and compressor control means periodically effecting atmospheric and sub-atmospheric pressure fluctuations for controlling pressurization of said compressor compression and lubricant sump portions, a lubrication valve for controlling the flow of lubricant between a lubricant pump and said compressor compression portion and between said compressor sump portion and an atmosphere lubricant reservoir for said pump in response to the periodic pressure fluctuations of said compressor control means comprising a housing having an inlet port for connection with said pump, an outlet port for connection with said compressor compression portion, a sump port for connection with said compressor sump portion, and a return port for connection with said reservoir, first and second passages in said housing between said inlet and outlet ports and between said sump and return ports, first and second valve seats in said first and second passages, a first valve member slidable in said first passage between said inlet port and first valve seat and normally urged into engagement with said first valve seat, a piston having opposed faces thereon and slidable in said housing between said first and second passages, said piston defining with said housing first and second chambers adjacent to said opposed piston faces, a first housing bore connecting said first chamber with said first passage between said first valve seat and outlet port, a second housing bore connecting said second chamber with said second passage between said second valve seat and return port, an extension on said piston slidable in said second housing bore and having a free end portion thereon defining a second valve member, said second chamber being in open communication with said return port, a spring in said first chamber between said housing and piston and normally urging said piston and extension in a direction to engage said second valve member with said second valve seat, a control port in said housing connected with said first chamber, said control port being adapted for connection with said compressor control means and subject to the periodic pressure fluctuations thereof, and a valve control member slidable in said first bore and interrupting communication between said first passage and first chamber, said valve control member having opposed free end portions in said first passage and first chamber for lost motion engagement between said first valve member and piston, said piston being movable against said spring when the pressure at said control port is sub-atmospheric to initially disengage said second valve member from said second valve seat and establish open communication between said sump and return ports through said second passage and said piston means being thereafter movable into engagement with one of said valve control member free ends to move said valve control member and the other free end thereof into lost motion engagement with said first valve member to subsequently disengage said first valve member from said first valve seat and establish open communication through said first passage between said inlet and outlet ports.

References Cited in the file of this patent
UNITED STATES PATENTS

| | | |
|---|---|---|
| 1,789,841 | Rennick | Jan. 20, 1931 |
| 1,936,778 | White | Nov. 28, 1933 |
| 1,986,481 | McCune | Jan. 1, 1935 |
| 2,145,114 | Gibbs et al. | Jan. 24, 1939 |
| 2,159,815 | McCune | May 23, 1939 |
| 2,163,800 | Nevin | June 27, 1939 |
| 2,285,426 | Freeman | June 9, 1942 |
| 2,652,071 | Morrison | Sept. 15, 1953 |
| 2,760,720 | Richardson | Aug. 28, 1956 |
| 2,818,210 | Philipp | Dec. 31, 1957 |
| 3,070,288 | Richards | Dec. 25, 1962 |